US007348379B2

(12) United States Patent
Van Engelen et al.

(10) Patent No.: US 7,348,379 B2
(45) Date of Patent: *Mar. 25, 2008

(54) COATING COMPOSITIONS COMPRISING A POLYISOCYANATE COMPOUND, A HYDROXYL-FUNCTIONAL FILM FORMING POLYMER, AND A NON VOLATILE BRANCHED MONOALCOHOL

(75) Inventors: Antonius H.G. Van Engelen, Noordwijkerhout (NL); Alexander Leo Yahkind, West Bloomfield, MI (US); Omar Abu-Shanab, Auburn Hills, MI (US); Jason Weaver, New Baltimore, MI (US)

(73) Assignee: Akzo Nobel N.V., Arnhem (NL)

( * ) Notice: Subject to any disclaimer, the term of this patent is extended or adjusted under 35 U.S.C. 154(b) by 220 days.

This patent is subject to a terminal disclaimer.

(21) Appl. No.: 10/958,771

(22) Filed: Oct. 5, 2004

(65) Prior Publication Data

US 2005/0053791 A1 Mar. 10, 2005

Related U.S. Application Data

(63) Continuation of application No. 09/928,138, filed on Aug. 10, 2001, now Pat. No. 6,903,158.

(60) Provisional application No. 60/224,139, filed on Aug. 10, 2000.

(30) Foreign Application Priority Data

Sep. 28, 2000 (EP) .................................. 00203453

(51) Int. Cl.
*C08J 3/00* (2006.01)
*C08J 3/24* (2006.01)
*C08K 3/20* (2006.01)
*C08K 5/05* (2006.01)
*C08L 75/00* (2006.01)

(52) U.S. Cl. ................. 524/590; 427/372.2; 427/385.5; 427/393; 427/408; 427/409; 427/389.7; 427/393.5; 428/423.1; 428/425.1; 428/425.5; 428/425.6; 428/425.8; 524/507; 524/589; 524/591; 524/839; 524/840; 524/385; 525/123; 525/455

(58) Field of Classification Search ................. 524/507, 524/589, 590, 591, 839, 840, 385; 525/123, 525/455; 428/423.1, 425.1, 425.5, 425.6, 428/425.8; 427/372.2, 385.5, 393, 408, 409, 427/389.7, 393.5
See application file for complete search history.

(56) References Cited

U.S. PATENT DOCUMENTS

| 4,007,151 | A |   | 2/1977  | Ogawa et al.     |         |
|-----------|---|---|---------|------------------|---------|
| 4,235,766 | A |   | 11/1980 | Kuijper          |         |
| 4,238,594 | A |   | 12/1980 | Pampouchidis     |         |
| 4,289,813 | A |   | 9/1981  | Blomeyer et al.  |         |
| 4,394,491 | A |   | 7/1983  | Hoffman          |         |
| 4,444,975 | A |   | 4/1984  | Pokorny          |         |
| 4,855,490 | A |   | 8/1989  | Markusch et al.  |         |
| 5,278,223 | A |   | 1/1994  | Gruenewaelder et al. |     |
| 5,286,782 | A |   | 2/1994  | Lamb et al.      |         |
| 5,741,880 | A |   | 4/1998  | Valpey, III et al. |       |
| 5,759,631 | A |   | 6/1998  | Rink et al.      |         |
| 5,916,986 | A | * | 6/1999  | Budde et al.     | 526/270 |
| 6,624,277 | B2|   | 9/2003  | Yahkind et al.   |         |
| 6,903,158 | B2| * | 6/2005  | Van Engelen et al. | 524/590 |

FOREIGN PATENT DOCUMENTS

BE        837 629        7/1976

(Continued)

OTHER PUBLICATIONS

European Search Report No. EP 00 20 3453, dated Feb. 23, 2001.

(Continued)

*Primary Examiner*—Patrick Niland
(74) *Attorney, Agent, or Firm*—Michelle J. Burke; David H. Vickrey

(57) ABSTRACT

The current invention relates to a coating composition comprising a polyisocyanate compound, a hydroxyl-functional film-forming polymer, and a non-volatile branched monoalcohol. An aliphatic branched monoalcohol is preferred. More preferred are long chain non-volatile branched monoalcohols. This results in coating compositions that have improved flow behavior and that produce coatings having improved appearance without an adverse effect on other properties.

The invention also relates to a multi-component coating composition. Preferably, the multi-component coating composition is a two-component coating composition comprising a polyisocyanate component and a hydroxyl-functional component, wherein the hydroxyl-functional component, in addition to the hydroxyl-functional film forming polymer also comprises the non-volatile branched monoalcohol. The non-volatile branched monoalcohol can be mixed with the hydroxyl-functional film forming polymer or can be added during the preparation of the hydroxyl functional film forming polymer.

Finally, the present invention relates to the use of the coating compositions in the refinish industry, in particular the body shop, to repair automobiles and transportation vehicles and in finishing large transportation vehicles such as trains, trucks, buses, and airplanes, and to a process for the preparation of a multilayer coating comprising the steps of applying a basecoat composition on an optionally coated substrate, optionally curing the basecoat, applying on top of the basecoat a clearcoat composition according to the present invention, and curing the multilayer coating.

37 Claims, No Drawings

FOREIGN PATENT DOCUMENTS

| | | |
|---|---|---|
| DE | 44 06 211 A1 | 8/1995 |
| EP | 0 219 131 A2 | 4/1987 |
| EP | 0 645 411 B1 | 3/1995 |
| EP | 0 713 863 B1 | 5/1996 |
| EP | 0 905 157 A1 | 3/1999 |
| EP | 0 936 257 A1 | 8/1999 |
| FR | 1 541 410 | 10/1967 |
| GB | 1113925 | 5/1968 |
| GB | 1 520 940 | 8/1978 |
| JP | 51-70227 | 6/1976 |
| WO | WO 96/40813 | 12/1996 |

OTHER PUBLICATIONS

European Search Report No. EP 01 20 0734, dated Jul. 4, 2001.
International Search Report No. PCT/US01/25155, dated Nov. 28, 2001.
Derwent Abstract 59666X/32 (1976) abstracting BE 837 629.
Derwent Abstract 20,125Q (1966) abstracting FR 1 541 410.
Derwent Abstract 58782X/31 (1976) abstracting JP 5 1070-227.
Derwent Abstract 95-303108/40 (1995) abstracting DE 44 06 211.
"Isofol® Alcohols and Isofol® Derivatives Defined Branched Alcohols for Multiple Applications," CONDEA, pp. 1-41, Mar. 1996.

* cited by examiner

COATING COMPOSITIONS COMPRISING A POLYISOCYANATE COMPOUND, A HYDROXYL-FUNCTIONAL FILM FORMING POLYMER, AND A NON VOLATILE BRANCHED MONOALCOHOL

CROSS REFERENCE TO RELATED APPLICATION

This application is a continuation of application Ser. No. 09/928,138, filed Aug. 10, 2001 now U.S. Pat. No. 6,903,158. This application claims priority of Provisional Application No. 60/224,139, filed on Aug. 10, 2000 and European patent application No. EP 00203453.6, filed on Sep. 28, 2000.

BACKGROUND OF THE INVENTION

There is an industry need to improve the flow behavior of coating compositions comprising polyisocyanate compounds and hydroxyl-functional film-forming polymers, and the appearance of coatings formed from such coating compositions while maintaining other properties of the coating compositions and coatings. It has been found that non-volatile branched monoalcohols can provide the desired improvements. Particularly useful are long chain linear monoalcohols with 12 or more carbon atoms. Since these monoalcohols with 12 or more carbon atoms are generally solid at ambient temperature, their use in coatings compositions, is thought to be limited. Surprisingly, it has been found that some long chain non-volatile branched monoalcohols are suitable as an additive in coating compositions, in particular multi-component (at least two component) coating compositions. This results in coating compositions that have improved flow behavior and that produce coatings having improved appearance without an unacceptably adverse effect on other properties.

Coating compositions comprising a polyisocyanate and polyol are known from, for example, European Patent Application No. 0 219 131. This reference also discloses use of such coating compositions for various purposes, including the top coating of relatively heavy weight articles, such as vehicles, industrial machinery and building and construction machinery.

Fast setting, fast curing coating compositions using acrylic binders with a high Tg are mentioned, for example, in U.S. Pat. Nos. 5,741,880 and 5,759,631. The combination of a hard acrylic with a low viscosity polyol is mentioned in U.S. Pat. No. 5,286,782. To obtain low VOC coating compositions, fast evaporating solvents with low photochemical reactive solvents such as acetone, methylacetate and tertiary butylacetate can be added. Combining fast evaporating solvents with acrylic binders can result in poor flow and appearance. To improve flow and appearance, large amounts of low viscosity polyols are sometimes added, but they may cause slower curing and poor setting.

U.S. Pat. No. 4,235,766 discloses a coating composition comprising an organic polyhydroxy compound and an organic polyisocyanate. The coating composition additionally comprises 2-methyl-2-propanol and/or 2-methyl-2-butanol. These monoalcohols are volatile compounds. A disadvantage in using volatile compounds is that there is no control in how much of the compound is built into the coating after application of the coating composition and how much evaporates and contributes to the VOC of the coating composition.

SUMMARY OF THE INVENTION

The current invention relates to a coating composition comprising a polyisocyanate compound, a hydroxyl-functional film-forming polymer, and a non-volatile branched monoalcohol. An aliphatic branched monoalcohol is preferred.

The invention also relates to a multi-component coating composition. Preferably, the multi-component coating composition is a two-component coating composition comprising a polyisocyanate component and a hydroxyl-functional component, wherein the hydroxyl-functional component, in addition to the hydroxyl-functional film forming polymer also comprises the non-volatile branched monoalcohol. The non-volatile branched monoalcohol can be mixed with the hydroxyl-functional film forming polymer or can be added during the preparation of the hydroxyl functional film forming polymer.

DETAILED DESCRIPTION OF THE INVENTION

Any non-volatile branched aliphatic monoalcohol may be used in the current invention. Non-volatile branched aliphatic monoalcohol preferably used in the current invention has at least 12 carbon atoms, more preferably at least 16 carbon atoms. Also a mixture of non-volatile branched monoalcohols with at least an average of 12 carbon atoms can be used, more preferably at least an average of 16 carbon atoms. Preferably, a Guerbet alcohol or Guerbet alcohol mixture is used, more preferably a Guerbet alcohol with at least 12 carbon atoms (or a mixture of Guerbet alcohols with at least an average of 12 carbon atoms), most preferably at least 16 carbon atoms (or a mixture of Guerbet alcohols with at least an average of 16 carbons). Guerbet alcohols are branched, primary alcohols that are linear, have two carbon chains and the branch point is always at the second carbon position.

The hydroxyl-functional film forming polymer has preferably a hydroxy value between 50 and 300 mg KOH/g based on solids, more preferably between 70 and 200 mg KOH/g. The number average molecular weight of the polymer is preferably lower than 6000 as measured by gel permeation chromatography with polystyrene as standard, more preferably less than 4500. The degree of molecular dispersion, i.e., the ratio of Mw to Mn, preferably is in the range of 1.1 to 5, the range from 1.1 to 3 being particularly preferred. The acid value of the polymer preferably is between 0 and 50 mg KOH/g based on solids. The Tg of the acrylic polyol is preferably greater than 25° C., more preferably greater than 40° C., most preferably between 60 and 110° C.

The hydroxyl-functional film forming polymers, include polyesters, polyacrylates, polyvinyl, polyurethanes, polycarbonates or polyamides for non-limiting example, and is preferably an acrylic polyol. The acrylic polyol is derived from hydroxy-functional acrylic monomers, such as hydroxy ethyl (meth)acrylate, hydroxy propyl (meth)acrylate, hydroxy butyl (meth)acrylate, other acrylic monomers such as (meth)acrylic acid, methyl (meth)acrylate, n-butyl (meth)acrylate, tert-butyl (meth)acrylate, isobornyl (meth)acrylate, trimethyl cyclohexyl (meth)acrylate, and optionally in combination with a vinyl derivative such as styrene, and the like, or mixtures thereof, wherein the terms (meth)acrylate and (meth)acrylic acid refer to both methacrylate and acrylate, as well as methacrylic acid and acrylic acid, respectively. The acrylic polyol is prepared by conventional methods, for instance, by the slow addition of appropriate monomers to a solvent solution of an appropriate polymerization initiator, such as an azo or peroxy initiator.

In the event that the non-volatile branched mono alcohol is added during the preparation of the hydroxyl-functional film forming polymer, preferably during the preparation of the acrylic polyol, the monoalcohol is preferably charged together with a solvent to a reaction vessel prior to the start of the polymerization process.

The weight ratio of the non-volatile branched monoalcohol to solid hydroxyl-functional film forming polymer is preferably 1:99 to 50:50, more preferably 5:95 to 25:75.

Polyisocyanates useful herein as polyisocyanate compounds and in polyisocyanate components comprise polyisocyanates having two or more, preferably two to four isocyanate groups. Non-limiting examples of polyisocyanates useful in the current invention include toluene diisocyanate, methylene bis(4-cyclohexylisocyanate), isophorone diisocyanate and its isocyanurate or adducts, hexamethylene diisocyanate and its isocyanurate, biuret, uretdione, and allophanate, and meta-tetramethylxylene diisocyanate and the adduct thereof with trimethylolpropane.

The polyisocyanate compound is used in an amount such that the ratio of isocyanate groups to the total number of hydroxyl groups in the coating composition is preferably in the range 0.8 to 2.

The solvent can be part of the hydroxl functional component, the polyisocyanate component and/or it can be a separate reducer. More particularly, in a multi-component system, the reducer may be one of the components. In a multi-component system, comprising a polyisocyanate component, a hydroxl functional component and a third component, the reducer may be the third component.

The coating composition can also comprise catalysts for the isocyanate-hydroxyl reaction, such as dibutyl tin dilaurate, triethyl amine, and the like. The coating compositions may also contain pigments. Inorganic as well as organic pigments can be used. The composition can further comprise conventional additives, such as stabilizers, surfactants, fillers, UV-absorbers, catalyst blockers, anti-oxidants, pigment dispersants, flow additives, rheology control agents, levelling agents, and solvents. The solvent can be any solvent known in the art., i.e. aliphatic and/or aromatic hydrocarbons. Examples include Solvesso® 100, Exxate 600, toluene, xylene, 4-chloro-benzotrifluoride, butanol, isopropanol, butyl acetate, tert.-butyl acetate, ethyl acetate, methyl acetate, methoxy propyl acetate, n-butyl propionate, ethoxyethylpropionate, acetone, methyl isobutyl ketone, methyl isoamyl ketone, methyl ethyl ketone, ether, ether alcohol, and ether ester, or a mixture of any of these.

Preferably, the coating composition comprises less than 550 g/l of volatile organic solvent based on the total composition, more preferably less than 500 g/l, most preferably less than 480 g/l.

The present invention also relates to a multi-component coating composition. Such multi-component coating composition comprises at least two components, i.e. a hydroxyl-functional component and a polyisocyanate component. Preferably, the multi-component coating composition comprises three components having a third component, i.e. a reducer, comprising solvents to provide a coating composition with a sprayable viscosity.

The coating composition of the present invention may be applied to any substrate. The substrate may be, for example, metal, plastic, wood, glass, ceramic, or another coating layer. The other coating layer may be comprised of the coating composition of the current invention or it may be a different coating composition. The coating compositions of the current invention show particular utility as clearcoats, basecoats, pigmented topcoats, primers, and fillers. The coating compositions can be applied by conventional means such as by spray gun, brush, or roller, spraying being preferred. Curing temperatures are preferably between 0 and 80° C., and more preferably between 20 and 60° C. The compositions are particularly suitable in the preparation of coated metal substrates, such as in the refinish industry, in particular the body shop, to repair automobiles and transportation vehicles and in finishing large transportation vehicles such as trains, trucks, buses, and airplanes.

Preferred is the use of the coating composition of the present invention as clearcoat. Clearcoats are required to be highly transparent and must adhere well to the basecoat layer. It is further required that the clearcoat does not change the aesthetic aspect of the basecoat by strike-in, i.e. discoloration of the basecoat due to solvents present in the clearcoat composition, or by yellowing of the clearcoat upon outdoor exposure. A clearcoat based on the coating composition of the present invention does not have these drawbacks.

Accordingly, the present invention also relates to a process for the preparation of a multilayer coating comprising the steps of applying a basecoat composition on an optionally coated substrate, optionally curing the basecoat, applying on top of the basecoat a clearcoat composition according to the present invention, and curing the multilayer coating.

In the case of the coating composition being a clearcoat, the basecoat may be a conventional basecoat known in the coating art. Examples are solvent borne basecoats, e.g. Autobase® ex Akzo Nobel Coatings and water borne basecoats, e.g., Autowave® ex Akzo Nobel Coatings. Furthermore, the basecoat may comprise pigments (color pigments, metallics and/or pearls), wax, solvents, flow additives, neutralizing agent, and defoamers. Also high-solid basecoats can be used. These are, for instance, based on polyols, imines, and isocyanates. The clearcoat composition is then applied to the surface of a basecoat and then cured. An intermediate curing step for the basecoat may be introduced.

The invention is further illustrated by the following specific but non-limiting examples.

EXAMPLES

Example 1

Acrylic Polyol 1

Acrylic Polyol 1 was produced by charging 700 g n-butyl propionate to a 5-liter, 4-neck round bottom flask equipped with a stirrer, condenser, heating mantle, thermocouple with thermowatch, nitrogen and addition inlets. The solvent was heated to the reflux temperature, 145-150° C. under a nitrogen blanket.

When the temperature reached and stabilized at reflux, 145-150° C., the following mixture was added supersurface to the flask over 180 minutes: 600 g styrene, 800 g tert-butyl methacrylate, 200 g n-butyl methacrylate, 400 g 2-hydroxyethyl methacrylate, and 79 g tert-butyl peroxy-3,5,5-trimethylhexanoate. During the addition of this mixture, the reaction temperature was kept at reflux and under nitrogen blanket. After completion of the addition, the addition lines were initially rinsed with 50 g of n-butyl acetate followed by a chaser addition mixture 50 g of n-butyl acetate and 1.0 g tert-butyl peroxy-3,5,5-trimethylhexanoate. The reaction temperature was held at reflux for an additional hour. Finally, 320 g n-butyl acetate was added as a letdown solvent.

The resulting solution of high solid Acrylic Polyol 1 had a non-volatile content of 64.3%, a Brookfield viscosity of 3,800 cps (25° C., Spindle 4 and 20 RPM), and a hydroxyl number of 86.3 (mg KOH/g on solids). The molecular weight of the polymer was measured using Waters' Associates gel permeation chromatography (GPC) and Phenomenex polystyrene standards. The high solid Acrylic Polyol 1 had an Mn of 3,020, an Mw of 8,134, a degree of dispersion, D, of 2.69 and a theoretical Tg of 87°.

Hydroxyl-functional Component 1

Hydroxyl-functional Component 1 was produced by mixing
74.3 g Acrylic Polyol 1 produced above,
4.2 g Guerbet alcohol having 18 carbon atoms (ISOFOL®18T from CONDEA Chemie GmbH, Hamburg, Germany),
8.0 g butyl acetate,
8.8 g acetone,
0.1 g dibutyl tin dilaurate (10% in butyl acetate),
1.7 g flow additive (Byk 310, ex Byk Chemie, 10% in xylene),
1.4 g UV stabilizer (Tinuvin 292, ex Ciba), and
1.4 g UV stabilizer (Tinuvin 1130, ex Ciba).

Polyisocyanate Component 1

The following were mixed to produce Polyisocyanate Component 1:
55 g isocyanurate of hexane diisocyanate (90% in butyl acetate, Desmodur N3390, ex Bayer),
16.2 g xylene,
16.8 g methoxypropyl acetate, and
11.4 g butyl acetate.

Reducer 1

The following were mixed to produce Reducer 1:
22.8 g acetone,
13.5 g methoxypropyl acetate, and
63.7 g Exxate 600.

Coating Composition 1 Formation and Application

The Hydroxyl-functional Component 1, the Polyisocyanate Component 1, and the Reducer 1 were mixed in a volume ratio 100:50:30 to produce a clear top coat version of the coating composition according to the present invention. In a first step, the Polyisocyanate Component 1 and the Reducer 1 were mixed together. In a second step, the Hydroxy-functional Component 1 was added. The clear top coat had a VOC of 4.0 lb/gal excluding acetone. The crosslink ratio NCO: OH was 1.4.

To evaluate the instant invention, test panels were primed with Colorbuild® sealer (ex Akzo Nobel Coatings), then sprayed with Autobase® basecoat (ex Akzo Nobel Coatings). The clear top coat prepared above was sprayed on the thus prepared panels. Properties of the clear top coating composition and the resulting coating are reported in Table 1.

Comparative Examples A and B

To demonstrate the improved flow and appearance resulting from the instant invention, Comparative Example A is a repetition of Example 1 except the non-volatile branched aliphatic monoalcohol is omitted; that is, no Guerbet alcohol is present. In Comparative Example B, the non-volatile branched aliphatic monoalcohol is replaced by Desmophen 670, an 80% polyester polyol solution in butyl acetate from Bayer.

Comparative Example A

Hydroxyl-functional Component A

Hydroxyl-functional Component A was produced by mixing
80.8 g Acrylic Polyol 1 produced above,
5.7 g butyl acetate,
8.8 g acetone,
0.1 g dibutyl tin dilaurate (10% in butyl acetate),
1.7 g flow additive (10% Byk 310, ex Byk Chemie in xylene)
1.4 g UV stabilizer (Tinuvin 292, ex Ciba), and
1.4 g UV stabilizer (Tinuvin 1130, ex Ciba).

Coating Composition A and Application

A coating composition A was prepared and applied identically to that of Example 1 except that the Hydroxyl-functional Component A was used. The VOC was 4.0 lb/gal excluding acetone. The crosslink ratio was 1.4. Properties of the coating composition of Comparative Example A and the resulting coating are reported in Table 1.

Comparative Example B

Hydroxyl-functional Component B

Hydroxyl-functional Component B was produced by mixing
74.3 g Acrylic Polyol 1 produced above (70% in methyl amyl ketone),
5.3 g Desmophen 670 (80% in butyl acetate),
6.9 g butyl acetate,
8.8 g acetone,
0.1 g dibutyl tin dilaurate (10% in butyl acetate),
1.7 g flow additive (10% Byk 310, Byk Chemie in xylene)
1.4 g UV stabilizer (Tinuvin 292, ex Ciba), and
1.4 g UV stabilizer (Tinuvin 1130, ex Ciba).

Coating Composition B and Application

A coating composition B was prepared and applied identically to that of Example 1 except that the Hydroxyl-functional Component B was used. The VOC was 4.0 lb/gal excluding acetone. The crosslink ratio was 1.4. Properties of the coating composition of Comparative Example B are reported in Table 1.

TABLE 1

| Property | Method (unit) | Example 1 | Comp. Example A | Comp. Example B |
| --- | --- | --- | --- | --- |
| Viscosity @ 70° F. | DC4 (sec) | 13.9 | 15.7 | 15.1 |
| Viscosity after 2 hrs. | DC4 (sec) | 23.2 | 20.3 | 21.2 |

TABLE 1-continued

| Property | Method (unit) | Example 1 | Comp. Example A | Comp. Example B |
|---|---|---|---|---|
| Free to handle @ 60° C. | Manual (min) | 36 | 29 | 35 |
| Hardness 1 day | Persoz (sec) | 62 | 59 | 52 |
| Hardness 7 day | Persoz (sec) | 151 | 159 | 124 |
| DOI (7 days) |  | 85 | 75 | 75 |
| Appearance | Visual (3 persons) | 8.5 | 6.5 | 6.7 |
| S short wave tension | Wave Scan (Byk) | 4.9 | 10.3 | 10.3 |
| L long wave tension | Wave Scan (Byk) | 31.1 | 33.2 | 34.1 |

As demonstrated by the data reported in Table 1, the use of the non-volatile branched monoalcohol provides surprising flow and appearance characteristics in the coating composition of the present invention while maintaining other desirable properties.

Example 2

Acrylic Polyol 2

Acrylic Polyol 2 was produced by charging 200 g n-butyl propionate and 500 g of Guerbet Alcohol, i.e. Isofol® 18T, to a 5-liter, 4-neck round bottom flask equipped with a stirrer, condenser, heating mantle, thermocouple with thermowatch, nitrogen and addition inlets. The mixture was heated to 150° C. under a nitrogen blanket.

When the temperature of 150° C. was reached, the following mixture was added supersurface to the flask over 180 minutes: 1000 g styrene, 200 g tert-butyl methacrylate, 400 g n-butyl methacrylate, 400 g 2-hydroxyethyl methacrylate, and 98 g tert-butyl peroxy-3,5,5-trimethylhexanoate. During the addition of this mixture, the reaction temperature was kept at reflux and under nitrogen blanket. After completion of the addition, the addition lines were initially rinsed with 50 g of tert-butyl acetate followed by a chaser addition mixture 50 g of tert-butyl acetate and 1.0 g tert-butyl peroxy-3,5,5-trimethylhexanoate. The reaction temperature was kept at 150° C. for an additional hour. Finally, 814 g tert-butyl acetate was added as a letdown solvent.

The resulting solution of high solid Acrylic Polyol 2 had a non-volatile content of 70.1%, a Brookfield viscosity of 1,800 cps at 65% (reduced with tert-butyl acetate 25° C., Spindle 4 and 20 RPM), and a hydroxyl number of 112.7 (mg KOH/g on solids). The molecular weight of the polymer was measured using Waters' Associates gel permeation chromatography (GPC) and Phenomenex polystyrene standards. The high solid Acrylic Polyol 2 had an Mn of 3,750, an Mw of 8,430, a degree of dispersion, D, of 2.2.

Hydroxyl-functional Component 2

Hydroxyl-functional Component 2 was produced by mixing
67.9 g Acrylic Polyol 2 produced above,
10.0 g ethoxyethylpropionate,
13.8 g acetone,
0.1 g dibutyl tin dilaurate (10% in butyl acetate),
1.7 g flow additive (10% Byk 310, Byk Chemie in xylene)
1.4 g UV stabilizer (Tinuvin 292, ex Ciba), and
1.4 g UV stabilizer (Tinuvin 1130, ex Ciba).

Hydroxyl-functional Component 3

Hydroxyl-functional Component 3 was produced by mixing
68.8 g Acrylic Polyol 1 produced above,
12.5 g Guerbet alcohol, i.e. Isofol® 18T,
3.5 g ethoxyethylpropionate,
12 g acetone,
0.2 g dibutyl tin dilaurate (10% in butyl acetate),
0.4 g flow additive (10% Byk 310, Byk Chemie in xylene)
1.3 g UV stabilizer (Tinuvin 292, ex Ciba), and
1.3 g UV stabilizer (Tinuvin 1130, ex Ciba).

Polyisocyanate Component 2

The following were mixed to produce a hardener:
70 g isocyanurate of hexane diisocyanate (Desmodur N3600, Bayer),
30 g tert-butyl acetate.

Polyisocyanate Component 3

65 g isocyanurate of hexane diisocyanate (Desmodur N3600, Bayer),
35 g 4-chloro-benzotrifluoride.

Coating Compositions 2 and 3 Formation and Application

The Hydroxyl-functional Component 2, the Polyisocyanate Component 2, and a reducer were mixed in a volume ratio 100:50:30 to produce a clearcoat version 2 of the coating composition according to the present invention. Tert-butylacetate was used as reducer for coating composition 2. Clearcoat version 3 was prepared in the same way except that 4-chloro-benzotrifluoride was used as a reducer. The clearcoats had a VOC of 2.0 lb/gal excluding exempt solvents at a spray viscosity of 13-14 seconds DC4.

To evaluate the instant invention, test panels were primed with Colorbuild® sealer (ex Akzo Nobel Coatings), then sprayed with Autobase® basecoat (ex Akzo Nobel Coatings). The clearcoat prepared above was sprayed on the thus prepared panels. Both clearcoats showed excellent flow and appearance.

We claim:

1. A coating composition comprising a mixture of a polyisocyanate compound, a hydroxyl-functional acrylic polyol, and a branched non-volatile monoalcohol.

2. The coating composition of claim 1 further comprising a reducer.

3. The coating composition of claim 1 wherein the monoalcohol has at least an average of 12 carbons.

4. The coating composition of claim 1 wherein the monoalcohol has at least an average of 16 carbons.

5. The coating composition of claim 1 wherein the monoalcohol is a Guerbet alcohol.

6. The coating composition of claim 1 wherein the weight ratio of the monoalcohol to solid acrylic polyol is 1:99 to 50:50.

7. The coating composition of claim 6 wherein the weight ratio is 5:95 to 25:75.

8. The coating composition of claim 1 wherein the hydroxyl-functional acrylic polyol has a Tg higher than 25° C.

9. The coating composition of claim 8 wherein the Tg is higher than 40° C.

10. The coating composition of claim 1 wherein the branched non-volatile monoalcohol is aliphatic.

11. The coating composition of claim 1 wherein the hydroxyl-functional acrylic polyol is prepared in the presence of the branched non-volatile monoalcohol.

12. A multi-component coating composition comprising a polyisocyanate component and a hydroxyl-functional component, wherein the hydroxyl-functional component comprises a hydroxyl-functional acrylic polyol and a branched non-volatile monoalcohol.

13. A multi-component coating composition according to claim 12 further comprising a third component wherein the third component is a reducer.

14. The multi-component coating composition of claim 12 wherein the monoalcohol has at least an average of 12 carbons.

15. The multi-component coating composition of claim 12 wherein the monoalcohol has at least an average of 16 carbons.

16. The multi-component coating composition of claim 12 wherein the monoalcohol is a Guerbet alcohol.

17. The multi-component coating composition of claim 12 wherein weight ratio of the monoalcohol to solid acrylic polyol is 1:99 to 50:50.

18. The multi-component coating composition of claim 17 wherein the weight ratio is 5:95 to 25:75.

19. The multi-component coating composition of claim 12 wherein the hydroxyl-functional acrylic polyol has a Tg of higher than 25° C.

20. The multi-component coating composition of claim 19 wherein the Tg is higher than 40° C.

21. The multi-component coating composition of claim 12 wherein the branched non-volatile monoalcohol is aliphatic.

22. The multi-component coating composition of claim 12 wherein the hydroxyl-functional acrylic polyol is prepared in the presence of the branched non-volatile monoalcohol.

23. A method of refinishing an automobile or transportation vehicle, the method comprising applying a coating composition according to claim 1 to the automobile or transportation vehicle.

24. A method of refinishing an automobile or transportation vehicle, the method comprising applying a multi-component coating composition according to claim 12 to the automobile or transportation vehicle.

25. A clearcoat composition comprising a coating composition according to claim 1.

26. A clearcoat composition comprising a multi-component coating composition according to claim 12.

27. Process for the preparation of a multi-layer coating comprising (a) applying a basecoat composition to a substrate, (b) applying a clearcoat composition according to claim 25 to the top of the basecoat composition to form a multi-layer coating composition, and (c) curing the multi-layer coating composition.

28. Process for the preparation of a multi-layer coating comprising (a) applying a basecoat composition to an optionally costed substrate, (b) applying on top of the basecoat composition a clearcoat composition according to claim 26 to form a multi-layer coating composition, end, and (c) curing the multi-layer coating composition.

29. A process according to claim 27 wherein the substrate is coated prior to applying the base coat of step (a).

30. A process according to claim 28 further comprising the step of curing the basecoat composition applied in step (a) prior to applying the clearcoat composition in step (b).

31. A coating composition according to claim 1 wherein the hydroxyl-function acrylic polyol is derived from hydroxy ethyl (meth)acrylate, hydroxy propyl (meth)acrylate, hydroxyl butyl (meth)acrylate, (meth)acrylic acid, methyl (meth)acrylate, n-butyl (meth)acrylate, tert-butyl (meth)acrylate, isobornyl (meth)acrylate, trimethyl cyclohexyl (meth)acrylate or mixtures thereof.

32. A method of coating a substrate comprising applying a coating composition according to claim 1 to the substrate and curing the coating composition.

33. A method according to claim 32 wherein the substrate is metal, plastic, wood, glass, ceramic, or another coating layer.

34. A method of refinishing a substrate, the method comprising applying a multi-component coating composition according to claim 12 to the substrate and curing the coating composition.

35. A method according to claim 34 wherein the substrate is metal, plastic, wood, glass, ceramic, or another coating layer.

36. A method according to claim 27 wherein the substrate is metal, plastic, wood, glass, ceramic, or another coating layer.

37. A method according to claim 28 wherein the substrate is metal, plastic, wood, glass, ceramic, or another coating layer.

* * * * *